United States Patent [19]

Ogden

[11] 4,168,822

[45] Sep. 25, 1979

[54] CUTTING TORCH MOUNTING AND GUIDE ASSEMBLY

[76] Inventor: Ralph Ogden, 1304 Fisher St., Munster, Ind. 46321

[21] Appl. No.: 860,991

[22] Filed: Dec. 15, 1977

[51] Int. Cl.$^2$ .............................................. B23K 7/10
[52] U.S. Cl. ........................................ 266/76; 266/77
[58] Field of Search ....................... 266/48, 68, 76, 77

[56] References Cited

U.S. PATENT DOCUMENTS

| | | | |
|---|---|---|---|
| 2,249,413 | 7/1941 | Bechtle et al. | 266/76 |
| 2,766,982 | 10/1956 | Bechtle et al. | 266/76 X |
| 3,595,545 | 7/1971 | Sitnichenko et al. | 266/76 |
| 3,980,126 | 9/1976 | Eberle | 266/68 X |
| 4,052,040 | 10/1977 | Ogden | 266/68 |

FOREIGN PATENT DOCUMENTS

| | | | |
|---|---|---|---|
| 534714 | 7/1941 | United Kingdom | 266/76 |
| 546098 | 6/1942 | United Kingdom | 266/76 |

*Primary Examiner*—Paul A. Bell

[57] ABSTRACT

A mounting and guide assembly for cutting torches for mounting same on a movable frame for movement over the workpiece, with the mounting and guide assembly comprising a torch mounting arrangement including a vertically disposed double acting hydraulic cylinder and piston device having a piston rod structure projecting from either end of its cylinder and mounting at the lower end of the piston rod a torch mounting head that releasably and adjustably secures the torch in place for positioning the torch nozzle for correct application to the workpiece. The torch mounting head is equipped with a feeler or guide member mounted for a lost motion movement range axially of the torch nozzle and having a plurality of feeler elements in coplanar arrangement that ride on the workpiece in spaced relation about the nozzle for maximum sensitivity of vertical undulations in the workpiece. The piston and cylinder device is incorporated in a hydraulic system that includes a hydraulic pressure liquid and a hydraulic pressure liquid flow orienting or directional control valve of the mechanical servo type, for supporting the torch and moving same axially of its nozzle. The feeler or guide member and the servo valve are operably connected to the torch mounting head for translating the movement of the feeler member in its lost motion range, due to elevational changes in the workpiece, as the torch moves across the workpiece, into adjustment of the servo valve to maintain the torch nozzle at the desired predetermined spacing above the workpiece, as torch cutting proceeds.

4 Claims, 7 Drawing Figures

CUTTING TORCH MOUNTING AND GUIDE ASSEMBLY

This invention relates to a cutting torch mounting and guide assembly, and more particularly, to a mounting arrangement for cutting torches wherein the torch nozzle will be maintained at the desired predetermined spacing or elevation above the workpiece as cutting proceeds, even though the workpiece may be warped or for other reasons have an uneven or undulating surfacing.

It is well known in the art of torch cutting metals that the nozzle of a cutting torch, for effective cutting purposes, should be maintained at a constant optimum spacing or elevation above the workpiece. For instance, flame cutting practices usually involve the workpiece being more or less horizontally disposed with the torch mounted on a frame that is moved over the workpiece during the cutting procedure. The nozzle spacing employed in any given situation is usually determined or set before cutting begins, and is determined by such factors as the flame forming constant constituents to be used, and the thickness of the workpiece.

However, during cutting, warping of the workpiece may occur, and the workpiece as supported is usually not perfectly parallel with the machine elements. Thus, adjustment of the nozzle spacing can be and usually is a continual need during the cutting procedure.

A number of guide arrangements have been devised as the result of efforts to solve this problem. Among these are mechanical devices employing a wheel that rides on one side or the other of the nozzle; these devices are not too reliable as they are single sided in application and have only a single point or line contact with the workpiece. Motorized guide systems are common, but usually involve complicated electrical circuitry that significantly adds to basic costs and maintainence problems. Air systems exist, but are not widely used because of practical difficulties in operation.

My application Ser. No. 701,368, filed June 30, 1976, now U.S. Pat. No. 4,052,040, granted Oct. 4, 1977 (the disclosure of which is hereby incorporated herein by this reference) discloses a cutting torch and guide assembly arrangement in which the torch body and support therefor are integrated into a double acting hydraulic cylinder and piston device in which the torch body is equipped as a piston and is reciprocably mounted in a cylinder through which the torch body extends to dispose the torch nozzle for application to the workpiece. The torch body is equipped with a feeler or guide mechanism that is operably connected to the hydraulic system of the cylinder and piston device to translate movement of the feeler and its lost motion range, due to elevational changes in the workpiece surfacing contacted, into adjustment of the nozzle height relative to the workpiece.

The subject matter of the present application is directed to an arrangement in which a torch mounting and guide assembly provides the advantages described in said application to any conventional torch that may be applied to the mounting and guide assembly.

A principal object of the present invention is to provide a cutting torch mounting and guide assembly adapted for use with conventional torches in which the selected torch nozzle height is maintained during use by providing for automatic adjustment utilizing a feeler or guide arrangement that is free of the weight of the torch, and that has a multiposition contact with the workpiece in uniform spacing about the nozzle for maximized sensing or feeling capability.

Another principal object of the invention is to provide a cutting torch mounting and guide assembly including a hydraulic system for supporting the torch and associated parts in which the feeler or guide member employed has a lost motion movement range, which feeler or guide is operably connected to the hydraulic system to translate movement of the feeler and its lost motion range, due to elevational changes in the workpiece surfacing contacted, into adjustment of the nozzle height, relative to the workpiece.

A further object of the invention is to provide a cutting torch mounting and guide assembly providing for hydraulic support and elevational control for the torch and its nozzle, which is arranged for application to same of conventional cutting torches, and to provide the torch employed with a feeler or guide device of the type disclosed in my said application.

Other objects of the invention are to provide a hydraulic cylinder supported torch mounting head arrangement in which the mounting head is equipped to both accept conventional torches and provide the torch applied to same with a feeler or guide device that is free of the weight of the torch, and that automatically maintains the torch nozzle spacing in the manner disclosed in my said application, and to provide a cutting torch mounting and guide assembly that is economical of manufacture, convenient to install and use, and long lived in operation.

In accordance with the present invention, the torch mounting and guide assembly comprises a torch mounting head integrated with a double acting hydraulic cylinder and piston device in which the cylinder of the device is arranged for securement to the movable frame and has a double ended piston rod structure extending therethrough on which is mounted the torch mounting head that is equipped to releasably and adjustably receive a conventional torch to dispose the torch in the normal vertically disposed operative position of the torch.

The torch mounting head is equipped with a feeler or guide member mounted for a lost motion movement range axially or longitudinally of the torch nozzle and having a feeler element arrangement of the type disclosed in my said application for multiple position contact with the workpiece about the nozzle.

The piston and cylinder device is incorporated in a hydraulic system and includes a hydraulic pressure liquid and hydraulic pressure liquid flow orienting or directional control valve of the mechanical servo type, for supporting the torch mounting head and torch supported by same from the cylinder and moving the torch axially or longitudinally of its nozzle between operative and inoperative positions. The servo valve of the hydraulic system is mounted on the double ended hydraulic piston rod of the hydraulic cylinder and piston device, and the feeler member and servo valve are operably connected through the torch mounting head for translating movement of the feeler or guide member in its lost motion range, due to elevational changes in the workpiece, into adjustment of the servo valve to maintain the torch nozzle supported by the mounting head at a desired predetermined spacing above the workpiece, as flame cutting proceeds.

Other objects, uses, and advantages will be obvious or become apparent from a consideration of the following detailed description and the application drawings in which like reference numerals indicate like parts throughout the several views.

However, it it is to be distinctly understood that the specific drawing illustrations provided are supplied primarily to comply with the requirements of the Patent Laws, and that the invention is susceptible of other embodiments which will be obvious to those skilled in the art, and which are intended to be covered by the appended claims.

GENERAL DESCRIPTION

Figure 5:
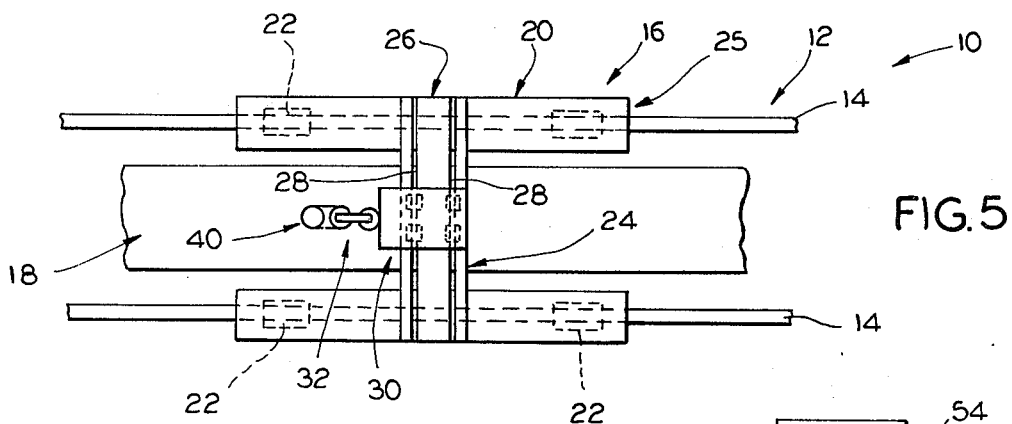
FIG. 5 is a diagrammatic plan view illustrating a typical application of the invention for flame cutting procedures.

Referring first to the generalized FIG. 5, reference numeral 10 generally indicates a flame cutting apparatus of the general type to which the invention relates, which apparatus comprises a trackway 12 defined by a pair of track rails 14 on which rides a gantry type flame cutting machine generally indicated at 16, which is arranged for Flame cutting of a metal plate 18 suitably supported between the track rails 14 IN a horizontal position, in accordance with conventional procedures.

The flame cutting machine, which is only diagrammatically illustrated and is intended only to be representative of a familiar type of basic flame cutting machinery, is shown to comprise a pair of trucks 20 each having a pair of wheels 22 of the usual flanged type for riding on the rails 14. The trucks 20 are connected together by a bridge structure 24 to form a wheeled frame 25 on which is mounted a trackway 26 defined by suitable rails 28 (shown applied to the bridge 24), on which rides a trolley or carriage 30 that operably mounts the flame cutting torch mounting and guide assembly of this invention, generally indicated by reference numeral 32, operably supporting a cutting torch 40.

Figure 7:
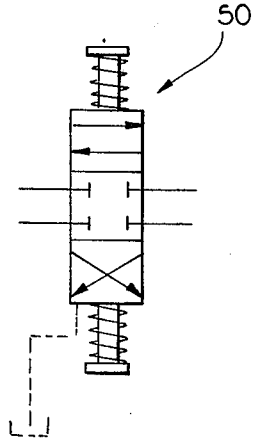
FIG. 7 is a diagram illustrating the general nature of the hydraulic pressure flow orienting valve employed in connection with the invention.
Figure 6:
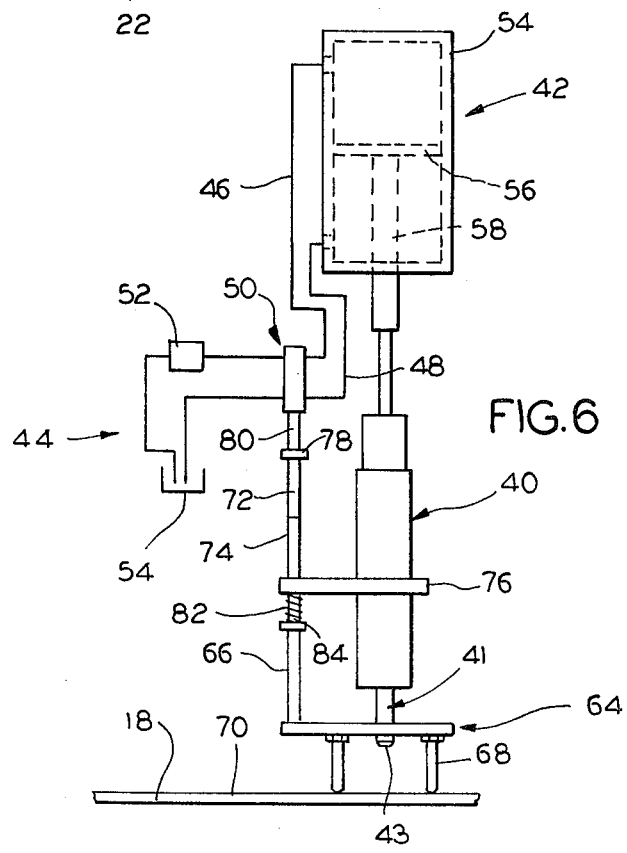
FIG. 6 is a schematic diagram in largely block diagram form illustrating the general nature of the subject matter involved.

The torch guide of assembly 32 and torch 40 are schematically outlined in FIG. 6, wherein the torch 40 is shown to be equipped with the nozzle or cutting tip 41 and is supported by double acting hydraulic cylinder device 42 that is incorporated in hydraulic system 44 which includes the hydraulic supplying conduits 46 and 48 connected between the device 42 and a four way servo control valve 50 which is of the general type indicated in FIG. 7. The valve 50 receives hydraulic pressure liquid from a suitable source, such as conventional hydraulic pump 52 and returns the hydraulic pressure liquid to tank 54.

The device 42 for illustrative purposes is shown to be a diagrammatically illustrated hydraulic cylinder 54 having reciprocably mounted in same the piston 56 having its piston rod 58 suitably connected to torch 40 for suspending the torch 40 for application to workpiece 18. For purposes of disclosure simplification, the usual movement guides for torch 40 are omitted from the diagrammatic illustration of FIG. 6.

Figures 1, 2:
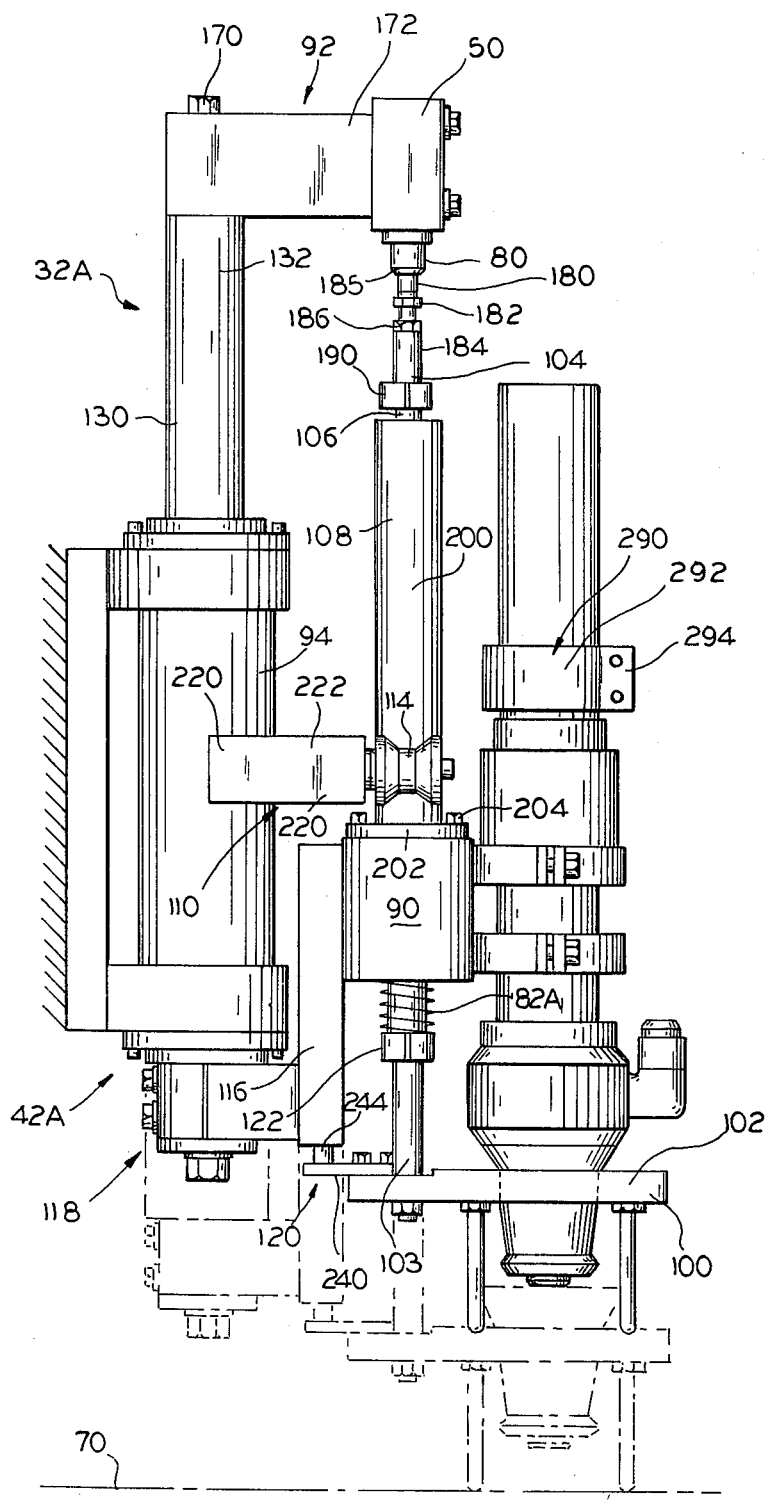
FIG. 1 is a side elevational view of one embodiment of the invention shown arranged to support a plasma torch, with the torch mounting and guide assembly and the torch carried thereby being shown in fully retracted solid line position and a dashed line operative position.
FIG. 2 is a front elevational view of the apparatus as shown in FIG. 1, taken from the right hand side of FIG. 1.
Figure 3:
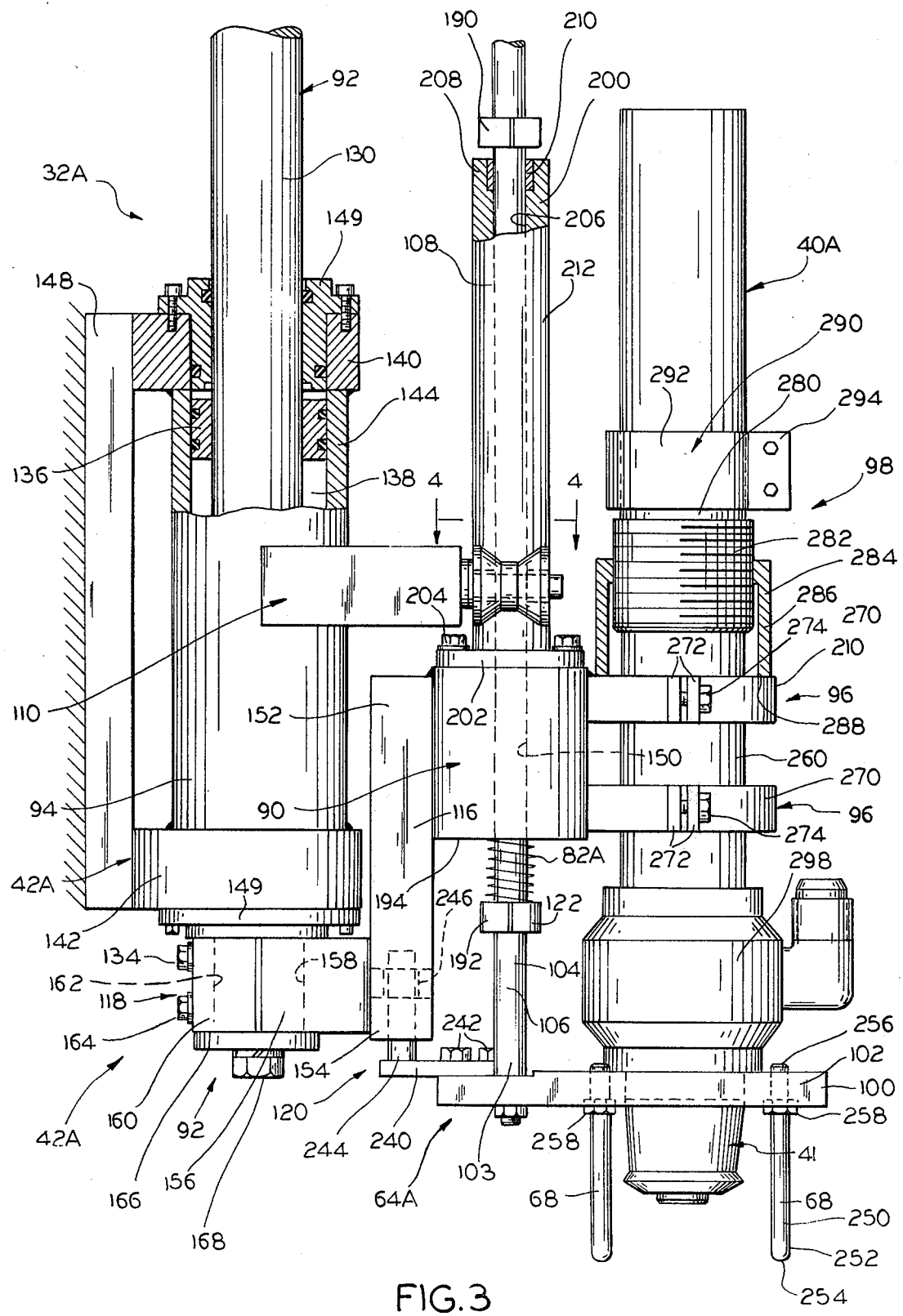
FIG. 3 is a view similar to that of FIG. 1, but on a somewhat enlarged scale and showing parts broken away.

The torch 40, which is intended to represent both plasma torches and flame cutting torches, in accordance with the invention has operably associated therewith a feeler or guide member 64 in the form of a frame member 66 that is shaped as indicated in FIGS. 1–3 and that is disposed about the usual torch nozzle 41 and mounts a plurality of feelers 68 that ride on the top surface 70 of the workpiece 18.

The feeler or guide member 64 in the diagrammatic form shown in FIG. 6 includes a pair of upright rod members 72 and 74 that are slidably received through a brace member 76 that is fixed with respect to the torch 40. Members 72 and 74 for purposes of illustration are joined together by cross member 78 that is secured to the spool valve member 80 of the directional flow control valve 50.

In the diagrammatic showing of FIG. 6, the guide or feeler member 64 is biased in the direction of the workpiece 18 by a suitable compression spring 82 interposed between spring seats 84 and the brace member 76. The springs 82, of course, do not support the weight of the torch 40.

In accordance with the general arrangement of the invention, when flame cutting of the plate 18 is to commence, the torch 40 is disposed, using the hydraulic cylinder device 42, to space the discharge end 43 of the nozzle 41 at the desired spacing from the upper surface 70 of the workpiece 18. This spacing is determined in the usual manner in accordance with the circumstances of the torch cutting operation to be commenced. The valve 50 is operated to achieve the positioning of the torch 40 that is desired, with the result being that when the apparatus is disposed as generally indicated in FIG. 6, the feelers will rest on the workpiece under the weight of the guide member 64 and the bias of spring 82, but free of the weight of the torch 40.

The feelers 68 are mounted on the frame 66 for adjustment longitudinally of the nozzle 41, and by appropriately adjusting the feelers 68 lengthwise of the nozzle 41, the apparatus may be set so that the valve 50 will be in its null position when the discharge end of the nozzle is at the desired elevation above the surface 70 of the workpiece 18.

As torch cutting starts and proceeds, the wheeled frame moves longitudinally of the trackway 12 in the usual manner, with the trolley 30 being held stationary and moved longitudinally of the bridge 24 in any suitable manner, as dictated by the needs of the cutting operation.

As the torch 40 moves relative to the workpiece, the feelers 68 ride along the workpiece surface 70. As long as there is no elevational change of the workpiece surface 70, the valve 50 remains at its null position. However, as the surface of the workpiece dips or rises, the feelers 68 and thus feeler member 64, follow same, whereby the feeler or guide member 64 moves downwardly or upwardly to correspondingly shift the valve 50 to one side or the other of its null position, whereby the torch 40 and consequently its nozzle 41 are shifted accordingly to maintain the desired spacing of the nozzle tip 43 above the workpiece surface 70.

In the specific improvement shown in FIGS. 1, 2 and 3, the torch mounting and guide assembly 32A comprises a torch mounting head 90 supported by the hydraulic cylinder and piston device 42A that comprises double ended piston rod structure 92 operably associated with hydraulic cylinder 94 that is suitably supported by the wheeled frame 25, and specifically its trolley 30. The mounting head 90 is connected to and is carried by the piston rod structure 92 and is equipped with one or more clamp devices 96 that are adapted to receive, in the specific form shown, a conventional plasma cutting torch 40A.

It will be understood, of course, that the mounting head 90 may be equipped with clamp devices 96 proportioned to hold any conventional plasma or flame cutting torch that is to be associated with the torch mounting and guide assembly 32A.

Further in accordance with the invention, a torch position adjusting device 98 is employed to permit rough and fine adjustment of the torch vertically of the mounting head 90, and the mounting head 90 is equipped with a guide or feeler member 64A that includes U-shaped member 100 shaped to define spaced apart legs 102 between which the nozzle 41 is disposed, and which support the feeler elements 68.

The feeler member 100 in the form shown is mounted on the lower end 103 of a single support rod 104 that extends upwardly through the mounting head 90 as well as a tubular guide post 108 mounted on the mounting head 90 for securement to the spool 80 of the servo valve 50 that in the embodiment illustrated is mounted on piston rod structure 92 and positioned so that the rod 104 and the spool 80 are in coaxial relation.

Figure 4:
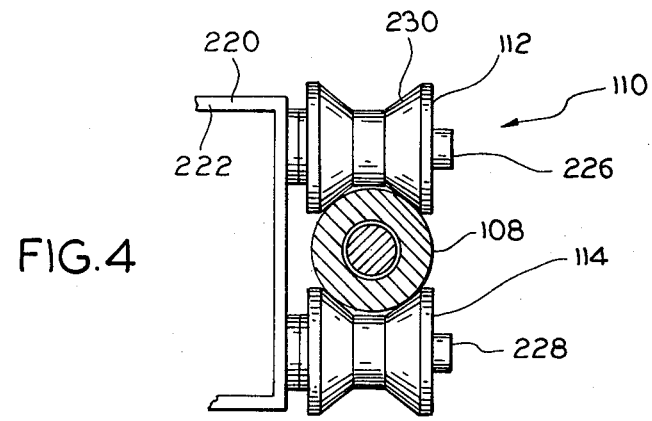
FIG. 4 is a fragmental cross-sectional view taken substantially along line 4—4 of FIG. 3.

Coacting between the cylinder 94 and the guide post 108 is the roller guide device 110 that is mounted on the cylinder 94 and includes a pair of opposed cooperating rollers 112 and 114 operably engaging the guide post 108 in the manner indicated in FIG. 4.

In the specific form shown, the mounting head 90 is mounted on the piston structure 92 by being affixed to support bar 116 that is equipped with clamp device 118 arranged for clamping engagement with the piston rod structure 92. Cooperating between the feeler member 64A and the support bar 116 is guide device 120 that permits the feeler member 64A to have the aforementioned lost motion movement without pivotal movement about the axis of support rod 104.

The roller guide device 110 holds the piston rod structure 92 and the parts and components it supports from side to side swinging movement about the longitudinal axis of cylinder 94; thus, the torch 40A, the mounting head 90, and the parts coaxial with same, the support bar 116, and the piston and cylinder device 42A are maintained in coplanar relation.

The feeler member 64A is shown biased in the direction of workpiece 18 by a suitable compression spring 82A acting between the head 90 and suitable locking collar 122. Where assembly 32A is to be vertically disposed, spring 82A is optional as the action of gravity will ordinarily suffice.

The assembly 32A functions basically in the same manner as assembly 32.

Assuming that the torch 40A is mounted in the assembly 32A and the torch nozzle 41 has been appropriately positioned with regard to the workpiece surface 70, as by suitable operation of the cylinder 94 and adjustment of the torch adjustment device 98, so that feeler member 64A is positioned to operate within its lost motion range and the spool 80 of valve 50 is at its null position, as the torch 40A and assembly 32A move relative to the workpiece, the feelers 68 ride along the workpiece surface 70. As long as there is no elevational change of the workpiece surface 70, the valve 50 remains at its null position. However, as the surface 70 of the workpiece dips or rises, the feelers 68, and thus the feeler member 64A, follow same, whereby the feeler or guide member 64A moves downwardly or upwardly to correspondingly shift the spool 80 of the valve 50 to one side or the other of its null position, whereby the torch and consequently its nozzle 41 are shifted accordingly, to maintain the desired spacing of the nozzle tip 42 above the workpiece surface 70.

SPECIFIC DESCRIPTION

The piston rod structure 92 comprises elongate piston rod 130 that extends through cylinder 94 such that its upper end 132 extends upwardly of cylinder 94 and its lower end 134 extends downwardly of the cylinder 94. The piston rod 130 has suitable piston 136 (see FIG. 3) suitably keyed thereto and reciprocably mounted within the chamber 138 defined by cylinder 94.

Hydraulic cylinder 94 is of the double acting type diagrammatically illustrated in FIG. 6 and its structural arrangement, as such, is largely optional. In the form shown, upper and lower heads 140 and 142 are suitably fixed to the usual sleeve like shell 144 defining the cylinder 94. The heads 140 and 142 in turn are suitably affixed to support or mounting plate or bar 148 that is in turn suitably mounted on trolley 30 in a convenient manner to have a positioning comparable to that shown in FIG. 5 relative to the workpiece 18. In the form shown, the heads 140 and 142 each have a rod cartridge 149 secured thereto through which rod 130 extends. The usual hydraulic seals may be provided, as suggested in FIG. 3. As is conventional, hydraulic conduiting connections to chamber 138 on either side of piston 136, of the double acting type suggested in FIG. 6, are provided for in any suitable manner.

The mounting head 90 is formed to define a central bore 150 through which the feeler member support rod 104 extends for connection to the valve spool 80. The head 90 is suitably fixed to the upper end 152 of support bar 116, as by employing welding. Affixed to the lower end 154 of the bar 116 is the clamp device 118, which comprises a base frame member 156 suitably affixed to the bar 116 as by employing welding, and shaped to define a curved seat 158 against which one side of the piston rod lower end 132 is applied. Coacting with the base member 156 is the top member 160 of device 118, which is formed with curved seat 162 that is applied against the other side of the piston rod lower end 132; suitable clamping bolts 164 seat the top frame member 160 against the base member 156 to mount the support bar 116 on the piston rod 130.

The piston rod lower end 134 has washer 166 secured thereto by suitable bolt 168 against which the clamp device 118 seats.

The piston rod 130 at its upper end 132 has affixed thereto, as by employing several bolts 170, the cross bar 172 to which the valve 50 is suitably affixed. As indicated, the valve 50 in its operating position is mounted so that its spool 80 is in coaxial relation with the support rod 104 of feeler member 64A, and this is also true with regard to the mounting head 90 and guide post 108.

The valve 50 may be of any suitable type, one commercial example of which is the Model CSVHS-400-S unit made and sold by Manatrol Division of Parker Hannifin Corporation of Elyrin, Ohio.

In the form shown, the spool 80 is spring biased downwardly of the valve 50 by conventional spring means that are not shown, and has its projecting end 180 in spring pressure transmitting relation against the head of bolt 182 that is threaded into the upper end 184 of rod 106 and held in place by jamb nut 186. Valve 50 may be arranged in the manner disclosed in my said application, and thus spool 80 includes the valve actuator 185 that is the part which seats against bolt 182. Valve 50 includes the usual porting and passageways essential for a servo valve of the type illustrated in FIGS. 6 and 7, and communicates with cylinder chamber 138 through suitable passageways formed in cross bar 172 and piston rod 130 in the manner suggested in my said application, or in any other suitable manner. Spool 80 has a stroke length on the order of $\frac{1}{8}$th inch, depending on the design specifics of the valve 50 employed.

In the form shown, the feeler support rod 104 is equipped with an upper split ring type locking collar 190 to define the lower limit of movement of the feeler 64A with respect to mounting head 90, as well as similar locking collar 122 that serves as a lower spring seat for the biasing spring 82A that has its upper end seated against the underside 194 of the head 90. The collars 122 and 190 may be any conventional type of clamping collar, such as the type shown in Moore U.S. Pat. No. 3,523,438.

The guide post 108 comprises tubular member 200 having a flanged foot 202 that is secured to the mounting head 90 by suitable bolts 204 applied at spaced apart points about foot 202. In the form shown, the head 90 is of cylindrical external transverse cross-sectional configuration, and accordingly the foot flange 202 is of similar configuration and has the bolts 204 applied to the diagonally opposite four corner points of the foot 202.

The post 108 defines bore 206 (see FIG. 3) through which the rod 106 extends, which bore at the post projecting end 208 is equipped with suitable bushing 210.

The cylindrical external surfacing 212 of post 108 is engaged by the rollers 112 and 114 of the roller guide device 110, which comprises in the form shown suitable U-shaped mounting bracket 220 having its legs 222 suitably secured to the cylinder shell 144, as by employing welding. The rollers 112 and 114 are mounted on suitable journalling pins 226 and 228 that are preferably of the eccentrically mounted adjustable type for close adjustment with the guide post surfacing 212. As indicated, the rollers 112 and 114 have their post engaging grooving 230 contoured for centering relation with post 108.

The guide device 120 for feeler 64A comprises adapter plate 240 suitably secured to the frame member 100 as by employing appropriate bolts 242 and bearing an upstanding stud 244 that is received in bushing 246 suitably mounted within the mounting bar 116. The guide device 120 permits rectilinear movement of the guide 64A vertically of head 90 but precludes swinging or rotational movement of the feeler member 64A about the axis of the mounting rod 104, so that frame 100 remains centered with respect to torch 40A.

The feeler members 68 each comprise a pin 250 having its feeling end 252 spherically contoured or rounded as at 254 for forming the feeler element contact surfaces with the workpiece surface 70. The pins 250 are threaded at their other ends 256 for adjustable threaded engagement with the frame 100 and locking in place with the respective jamb nuts 258.

The torch 40A is of conventional construction and is intended to represent any conventional torch. In the form shown, the torch 40A is a plasma torch and comprises cylindrical body 260 and other familiar component parts, including the nozzle 41, that are shown in largely block diagram form, as the invention is concerned with the mounting of any conventional cutting torch on the frame 25.

The clamp devices 96 are of the "C" type and each define a split ring or a C-shaped clamping member 270 that is suitably affixed to the mounting head 90 (as by employing welding), and that is flanged as at 272 for application thereto of a clamping bolt 274 to clamp the devices 96 against the torch body 260. The devices 96 are proportioned in accordance with the type of torch to be mounted by the assembly 32 so that the devices 90 may have their members 270 clamped against the body 260 in firm gripping relation thereto.

The torch position adjusting device 98 comprises a sleeve 280 suitably fixed to the torch body 260 and having a threaded surface 282 on which is threaded adjustment nut 284 that defines depending flange 286 having its lower end formed to define annular planar seat 288 which engages on top of the upper clamp device 96.

Associated with the sleeve 280 and nut 284 is the clamping device 290 in the form of C-shaped clamping member 292 that is flanged as at 294 for application thereto of suitable bolts 296 to lock the device 290 in clamping relation with the torch body 260, whereby the clamp device 290 serves as a fixed stop on the torch body 260.

Utilizing device 98 in connection with the application of a torch, such as torch 40A, to assembly 32A, the clamp devices 96 are loosened and the torch body 260 suitably applied thereto, as may be appropriate for the specific type of torch employed. In some instances this may involve separation of the torch body 260 from the torch head 298, or application to the torch body of the sleeve 280 after the torch body is disposed with respect to the head 90 as indicated in FIGS. 1–3.

In any event, when the torch body 260 that has been applied to the clamp devices 96 is equipped with the sleeve 282 and its nut 284, as well as a clamp device 290, with the latter securely clamped against the torch body 260, the torch body 260 is rested on the upper clamp device 96 by resting the nut 284, and specifically, its bearing surface 288, on the upper clamp device 96 so that clamp device 290 will in turn rest on the upper end of sleeve 280 (the clamp devices 96 at the point remaining open to freely receive the body 260).

The clamp device 290 is initially positioned longitudinally of the body 260 to give a rough or coarse adjustment of the nozzle 41, and specifically its lower end 43, relative to the workpiece surface 70 for a predetermined position of mounted head 90 above the workpiece (that is obtained by operation of device 42A). With the clamp device 290 clamped against body 260 to hold the torch in its position of rough adjustment, the nut 284 is threaded upwardly or downwardly of sleeve 282, as may be necessary, to give the torch nozzle 41 the desired fine adjustment as to the elevation of its lower end above the workpiece surface 70. When this is accomplished, the clamp devices 96 may be firmly clamped against the torch body 260 to hold the torch in the desired position relative to the workpiece.

As already indicated, proper setting of the feeler member 64A with respect to surface 70 and valve 50, so as to dispose valve 50 in its null position when feeler elements 68 rest on surface 70, is permitted by loosening of the feeler element jamb nuts 258 and any necessary threading of the pins 250 relative to their frame 100, after which nuts 258 are retightened.

It will therefore be seen that the invention provides a cutting torch mounting and guide assembly for both the mounting of cutting torches on equipment such as that indicated in FIG. 5, and for automatic adjustment of the height of the torch nozzle 41 above the workpiece as the feeler elements 68 encounter variations in the elevation of the surface contour of the workpiece top surface 70.

The feeler or guide member 64A is of light weight and rests directly on the workpiece, and is freed of the weight of the torch itself.

The hydraulic system per se may be of any suitable type assuming the double acting operation contemplated and the general arrangement of the mechanical type servo valve 102 to be the governing factors involved.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a cutting torch mounting and guide assembly for mounting the torch in an operative vertical position on a support for movement over a workpiece for disposing the torch nozzle in torch cutting spaced relation with respect to the workpiece, the improvement comprising:
   a cylinder structure defining a longitudinal central axis, and including means for mounting same in a vertical position on the support,
   a piston rod structure reciprocably mounted in said cylinder structure for movement axially of said cylinder structure and having opposite ends projecting from either end of said cylinder structure,
   a torch support assembly carried by the lower end of said piston rod structure and movable with said piston rod structure,
   said torch support assembly comprising:
   a head member disposed to one side of said cylinder structure axis and including means for releasably securing the torch thereto exteriorly of said cylinder structure for mounting same in said vertical position thereof, with the torch nozzle directed downwardly,
   a feeler member having a plurality of feelers disposed to be positioned in spaced apart relation about the torch nozzle when the torch is mounted in its said operative position,
   said feeler member being mounted for a lost motion movement range axially of said cylinder structure relative to the torch when the torch is mounted in its said operative position,
   hydraulic means for supporting said piston rod structure from said cylinder structure and for moving same axially of said cylinder structure,
   said hydraulic means including a hydraulic system for positioning said piston rod structure relative to said cylinder structure to dispose the torch nozzle, when the torch is mounted in its operative position, at a predetermined spacing above the workpiece with said feeler member resting on the workpiece and disposed in its said lost motion range to provide the operative position of the torch for torch cutting purposes,
   said hydraulic system including a hydraulic pressure liquid and hydraulic pressure liquid flow orienting means controlling the flow of the hydraulic pressure liquid to effect said supporting, moving and positioning of said piston rod structure,
   and means for translating movement of said feeler member in its said lost motion range due to elevational changes in the workpiece into adjustment of said flow orienting means to maintain the torch nozzle at said spacing above the workpiece, on movement of the support along the workpiece for torch cutting purposes,
   said flow orienting means comprising servo valve means carried by the upper end of said piston rod structure,
   said feeler member being operatively connected to said servo valve means through said head member for forming said translating means,
   said cylinder structure and said piston rod structure comprising a hydraulic cylinder and piston device forming a part of said hydraulic means with said cylinder and piston device being connected in double acting relation in said hydraulic system for said supporting, moving and positioning of said piston rod structure relative to said cylinder structure,
   said servo valve means and said feeler member being in vertically aligned coaxial relation,
   and including a guide post mounted on said head member through which said feeler member is connected to said servo valve means,
   guide means acting on either side of said guide post and mounted on said cylinder structure for holding said piston rod structure and said torch support assembly against movement about the longitudinal axis of said cylinder structure,
   and means for holding said feeler member against movement about the longitudinal axis of said guide post.

2. The improvement set forth in claim 1 wherein:
   said releasable securing means includes means for adjusting the torch vertically when the torch is mounted in its operative position,
   said adjusting means comprising:
   a releasable clamping device fixed to said head member through which the torch extends in its operative position,
   a threaded sleeve through which the torch is freely received,
   a nut threadedly received on said sleeve and resting on said clamp device,
   and a stop ring fixed to the torch and resting on said sleeve when the torch is in its operative position,
   whereby rotation of said nut about said sleeve effects said vertical adjustment of said torch when the torch is mounted in its operative position,
   said clamping device including means for releasably fixing the torch against vertical movement relative to said mounting head when the torch is in its operative position.

3. In a cutting apparatus comprising a cutting torch mounted in an operative vertical position on a frame movable along a trackway for torch cutting of a workpiece positioned for torch cutting along the path of movement of the frame and means for moving the frame along the trackway, a torch mounting arrangement therefor and in combination therewith, comprising:

a cylinder structure defining a longitudinal central axis, and including means for mounting same in a vertical position on the support, a piston rod structure reciprocably mounted in said cylinder structure for movement axially of said cylinder structure and having opposite ends projecting from either end of said cylinder structure, a torch support assembly carried by the lower end of said piston rod structure and movable with said piston rod structure, said torch support assembly comprising:

a head member disposed to one side of said cylinder structure axis and including means for releasably securing the torch thereto exteriorly of said cylinder structure for mounting same in said vertical position thereof with the torch nozzle directed downwardly, a feeler member having a plurality of feelers disposed to be positioned in spaced apart relation about the torch nozzle when the torch is mounted in its said operative position, said feeler member being mounted for a lost motion movement range axially of said cylinder structure relative to the torch when the torch is mounted in its said operative position, hydraulic means for supporting said piston rod structure from said cylinder structure and for moving same axially of said cylinder structure, said hydraulic means including a hydraulic system for positioning said piston rod structure relative to said cylinder structure to dispose the torch nozzle, at a predetermined spacing above the workpiece with said feeler member resting on the workpiece and disposed in its said lost motion range to provide the operative position of the torch for torch cutting purposes, said hydraulic system including a hydraulic pressure liquid and hydraulic pressure liquid flow orienting means controlling the flow of the hydraulic pressure liquid to effect said supporting, moving and positioning of said piston rod structure, and means for translating movement of said feeler member in its said lost motion range due to elevational changes in the workpiece into adjustment of said flow orienting means to maintain the torch nozzle at said spacing above the workpiece, on movement of the frame along the trackway for torch cutting purposes, said flow orienting means comprising servo valve means carried by the upper end of said piston rod structure, said feeler member being connected to said servo valve means through said head member for forming said translating means, said cylinder structure and said piston rod structure comprising a hydraulic cylinder and piston device forming a part of said hydraulic means with said cylinder and piston device being connected in double acting relation in said hydraulic system for said supporting, moving, and positioning of said piston rod structure relative to said cylinder structure, said servo valve means and said feeler member being in vertically aligned coaxial relation, and including a guide post mounted on said head member through which said feeler member is connected to said servo valve means, guide means acting on either side of said guide post and mounted on said cylinder structure for holding said piston rod structure and said torch support assembly against movement about the longitudinal axis of said cylinder structure, and means for holding said feeler member against movement about the longitudinal axis of said guide post, said cylinder structure, said head member and guide post carried thereby, and said torch being in coplanar relation with said head member and guide post being intermediate said cylinder structure and said torch.

4. The improvement set forth in claim 3 wherein:

said releasable securing means includes means for adjusting the torch vertically when the torch is mounted in its operative position, said adjusting means comprising:

a releasable clamping device fixed to said head member through which the torch extends, a threaded sleeve through which the torch is freely received, a nut threadedly received on said sleeve and resting on said clamp device, and a stop ring fixed to the torch and resting on said sleeve, whereby rotation of said nut about said sleeve effects said vertical adjustment of said torch when the torch is mounted in its operative position, said clamping device including means for releasably fixing the torch against vertical movement relative to said mounting head when the torch is in its operative position.

* * * * *